United States Patent [19]

Blake et al.

[11] 4,335,155
[45] Jun. 15, 1982

[54] COMPOSITION FOR AERATED FROZEN DESSERTS CONTAINING FRUIT PUREE AND METHOD OF PREPARATION

[75] Inventors: Jon R. Blake, Brooklyn Center; Richard K. Knutson, Corcoran; Deon L. Strommer, Minneapolis, all of Minn.

[73] Assignee: General Mills, Inc., Minneapolis, Minn.

[21] Appl. No.: 241,293

[22] Filed: Mar. 6, 1981

[51] Int. Cl.³ .............................................. A23G 9/02
[52] U.S. Cl. ..................................... 426/565; 426/639
[58] Field of Search ............... 426/565, 566, 567, 639

[56] References Cited

U.S. PATENT DOCUMENTS

| | | | |
|---|---|---|---|
| 2,002,963 | 5/1935 | Schade | 426/565 |
| 2,131,650 | 9/1938 | Webb | 426/565 |
| 2,651,575 | 9/1953 | Talburt | 426/565 |
| 3,236,658 | 2/1966 | Little | 426/567 |
| 3,956,519 | 5/1976 | Evans et al. | 426/565 |
| 4,143,172 | 3/1979 | Mitchell et al. | 426/565 |
| 4,146,652 | 3/1979 | Kahn et al. | 426/564 |
| 4,232,049 | 11/1980 | Blake | 426/572 |
| 4,232,053 | 11/1980 | Blake | 426/616 |
| 4,244,977 | 1/1981 | Kahn et al. | 426/565 |
| 4,244,981 | 1/1981 | Blake | 426/567 |

*Primary Examiner*—Jeanette M. Hunter
*Attorney, Agent, or Firm*—Gene O. Enockson; John A. O'Toole

[57] ABSTRACT

Non-dairy dessert compositions suitable for the preparation of aerated frozen desserts by either commercial agitated freezing or by at-home static freezing. The compositions comprise from about 35% by weight to about 80% of a specially prepared cooked fruit base, from about 0.3% to 1.5% by weight of an acid-stable whipping agent, from about 0.05% to 0.5% by weight of an acid-stable polysaccharide gum, from about 1% to about 15% of a malto dextrin bodying agent, and from about 1% to 10% of an edible fatty triglyceride oil. The moisture content of the dessert compositions ranges between about 45% to 75%.

14 Claims, No Drawings

COMPOSITION FOR AERATED FROZEN DESSERTS CONTAINING FRUIT PUREE AND METHOD OF PREPARATION

BACKGROUND OF THE INVENTION

1. Field of the Invention

The present invention relates to food compositions and to their methods of preparation. More particularly, the present invention in its product aspect relates to dessert compositions for aerated frozen desserts containing comminuted whole fruit. In its method aspect, the present invention relates to a method of preparing a dessert composition.

2. The Prior Art

A wide variety of dessert compositions are known from which frozen desserts can be prepared. Such compositions can be divided into dairy-based compositions (e.g., ice cream, some sherbets, etc.) and non-dairy based compositions (e.g., fruit ices). Non-dairy based frozen desserts are characterized in part by an absence of any milk-derived components including milk or butterfat, non-fat milk solids or sugars or even milk derived proteins such as whey solids or caseinate. Such compositions are particularly useful for consumption by individuals having lactose intollerancy. Non-dairy frozen desserts can be further divided into non-aerated compositions such as popsicles, on the one hand and aerated or aerable compositions, on the other. The present invention relates to aerated dessert compositions.

Art-known non-dairy dessert compositions for the preparation of aerated frozen desserts include those disclosed in U.S. patent application Ser. No. 44,798, filed May 31, 1979 to J. R. Blake (see also Ser. No. 43,993, filed May 31, 1979 to J. R. Blake and which is incorporated herein by reference). These compositions comprise a specially prepared cooked comestible base as well as several other components such as stabilizer gums, edible fatty triglycerides and whipping agents. The comestible base is taught as essentially comprising citrus juice vesicles, ungelatinized starch, water-soluble pectin, an edible non-volatile organic acid and a nutritive carbohydrate sweetening agent. These compositions can be used for the at-home preparation of aerated frozen desserts by static freezing after aeration as well as by commercial preparation. Another advantage provided by these known dessert compositions is "heat shock" stability.

The present invention is an improvement in the known dessert compositions. The improvement resides, in part, in the surprising discovery that ingredients previously recognized as essential can be eliminated without substantial loss of the benefits of such prior compositions. The improvement resides also in part in the further surprising discovery that other whole fruit materials can be used in substitution for the previously recognized as essential component of citrus juice vesicle solids.

Another benefit provided by certain embodiments of the present compositions are aerated frozen, fruit based desserts containing only "natural" ingredients, i.e., free from added emulsifiers, artificial flavors, colors, preservatives and the like.

Still another benefit provided by the present composition is "spoonability" i.e., the ease with which the material can be scooped or deformed at freezer temperatures ($-20°$ F. to $0°$ F.) even after extended storage at freezer temperatures.

Still another benefit of the present invention is the provision of dessert compositions substantially free of milk based ingredients.

SUMMARY OF THE INVENTION

The present invention relates to dessert compositions containing whole fruit puree suitable for the preparation of aerated frozen desserts by either commercial agitated freezing or by at-home static freezing.

The dessert compositions essentially comprise from about 35% by weight to about 80% of a cooked fruit base, from about 0.3% to 1.5% of an acid-stable whipping agent, from about 0.05% to 0.5% by weight of an acid-stable polysaccharide gum, from about 1% to 15% of a malto dextrin bodying agent and from about 1% to 10% of an edible fatty triglyceride oil. The moisture content of the dessert compositions range between about 45% to 75%. The specially prepared cooked fruit base is prepared by forming an uncooked blend comprising from about 25% to about 80% by weight of the blend of whole comminuted fruit pulp having a moisture content of between about 75% to 90% by weight, from about 20% to 75% by weight of the base of a nutritive carbohydrate sweetening agent, and optionally, some or all of the malto dextrin bodying agent. The blend is then cooked at atmospheric pressure at a temperature ranging between about 180° F. to 210° F. for a period of time ranging from about 30 to 60 minutes.

An aerated frozen dessert having a density of 0.2 to 0.95 g./cc. can be prepared from the present dessert compositions in conventional aerated frozen dessert equipment. Such dessert products are prepared by aerating the present dessert compositions and either simultaneously or sequentially freezing.

Throughout the specification and claims, percentages and ratios are by weight and temperatures are given in degrees Fahrenheit, unless otherwise indicated.

DETAILED DESCRIPTION OF THE INVENTION

The present invention relates to dessert compositions containing whole comminuted fruit for the preparation of aerated frozen desserts. The present desserts are soft and spoonable even at typical freezer temperatures (i.e., 0° F.). While certain embodiments of the present invention provide satisfactory compositions for the static freezing method of preparation characteristic of at-home preparation, the present compositions have particular suitability for industrial and commercial preparation.

The present frozen dessert compositions do not contain as essential components either emulsifiers or dairy-based components of conventional frozen desserts. The present dessert compositions consist essentially of A. a specially prepared cooked fruit base containing (1) fruit puree, (2) a nutritive carbohydrate sweetening agent, and (3) a malto dextrin bodying agent; B. an acid-stable whipping agent; C. an acid-stable polysaccharide gum; D. an edible fatty triglyceride; and E. moisture. Each of these frozen dessert composition ingredients as well as product preparation and product use are described in detail below.

A. Cooked Fruit Base

A cooked fruit base containing whole comminuted fruit is the principal component of the present frozen dessert compositions. Surprisingly, it has been discovered that cooked bases useful in frozen, aerated dessert compositions can be prepared employing whole fruit puree's in total substitution for selected citrus fruit constituents. The present compositions essentially comprise from about 35% to 80% by weight of the cooked fruit base. Better results are achieved when the present compositions contain from about 40% to 60% of the cooked fruit base. Best results are achieved when the cooked base comprises from about 45% to 55% of the present compositions.

It is essential to the practice of the present invention that the cooked fruit base is prepared according to the following method. The method includes the steps of blending fruit pulp, nutritive sweeteners and, optionally, the malto dextrin bodying agents and, thereafter, cooking the blend in prescribed manner to provide the present cooked fruit base. The cooking step is desirably practiced so as to minimize loss of moisture and volatile aroma/flavor constituents.

Blend Preparation

A blend is prepared consisting essentially of:
1. Fruit Puree

Fruit puree is the principal component of the presently prepared blend. The term "puree" has been used in the art to refer to both heat treated, e.g., boiled, and untreated food pulp. As used herein, however, "puree" is meant to refer only to unheat-treated whole fruit pieces which have been mechanically transformed into fluids. After cooking, the blend to form the cooked fruit base as described in detail below and combining the cooked fruit base with the other essential frozen dessert composition ingredients, the modified-by-cooking fruit puree(s) provide the structuring and bulk to the present frozen desserts. Moreover, the modified fruit puree(s) additionally serve to bind the present essential fatty triglyceride ingredient without requiring the utilization of conventional emulsifiers. Of course, the fruit ingredient provides characteristic fruit flavor and color.

Surprisingly, puree(s) made from any fruit can be used herein. Examples of such fruits include pineapple, lemon, orange, peach, pear, grape, mango, apple, tomato, banana, plums, blueberries, raspberries, strawberries, blackberries, currents, cherries, and mixtures thereof. Preferred fruits are selected from the group consisting of strawberries, cherries, blueberries, raspberries, and mixtures thereof. Fresh fruit is, of course, highly preferred for preparing puree(s) for use herein. However, previously frozen fruit is also suitable for use herein.

Fruit puree(s) as defined herein, of course, are well known and the skilled artisan will have no problem preparing puree(s) from suitable fruit(s). Generally, fruit puree(s) are prepared by simply comminuting whole fruit in known equipment. For those fruits containing small seeds, e.g., grapes, strawberries, blackberries, as opposed to peaches, plums or apples, a post-comminuting deseeding step may be necessary to provide the desirably seedless fruit puree's useful herein. Typically, either manual or mechanical deseeding involves screening the comminuted fruit to separate the seeds from the fruit puree.

In a preferred embodiment of the present frozen dessert compositions, it is highly desirable to employ homogenized seedless fruit puree(s) in the preparation of the cooked base ingredient. Homogenization is used herein to accomplish particle size reduction. Of course, other particle size reduction techniques are also contemplated herein. Homogenized fruit puree(s) can be prepared using conventional homogenization methods and apparatus. Generally homogenizers are divided into two groups according to the kind of energy introduced into the medium homogenized: (1) rotor or rotor-stator systems, e.g., agitators, emulsifying pumps and colloid mills, and (2) pressure systems, e.g., wedge resonators and pressure homogenizers. The pressure homogenizers are predominantly used in food processing since they have the best homogenizing effects. Preferably, such units which are used in the preparation of the homogenized fruit puree(s) usefully employed in the present cooked fruit bases are those homogenizers which are constructed to prevent contamination. Typically, fruit puree(s) are easily homogenized employing wide ranges of homogenization pressures, e.g., 1,000 to 8,000 p.s.i.g. One or more homogenization steps at the same or different pressures can be employed.

Unfortunately, homogenized fruit puree(s) is not readily amenable to analysis of their particle size distributions due to the solids constituents of the puree being partially dissolved/suspended in nature and due to the high viscosity of the puree. Sufficient homogenization for the present invention is achieved, however, when the homogenized fruit purees' taste perception is particle free or homogenous, e.g., similar texturally to catsup.

The fruit puree(s) is present in the uncooked blend in amounts of from about 25% to 80% by weight (wet basis) of the uncooked blend. Superior results in terms of structuring ability and flavor, for example, are achieved when the fruit puree(s) is present at from about 50% to 70%. Best results are obtained when the puree(s) is present at from about 55% to 65% of the uncooked blend.

Fruit puree generally contains about 75% to 90% moisture. Thus, when only the solid materials provided by the fruit puree is considered, the fruit puree solids comprise from about 3% to 20% of the present fruit base. Preferably about 6.5% to 8.8% and most preferably from about 7% to about 8.1%.

2. Sweetening Agent

A nutritive carbohydrate sweetening agent is an essential component herein and is present in the present food compositions at from about 15% to 20%. It is essential that most of the sweetening agent(s) is added to the present uncooked fruit base blend. That is, about 75% to 95% of the sweetening agent employed should be added to the fruit base blend. Thus, the uncooked fruit base blend essentially comprises from about 10% to 50% of the sweetening agent, preferably at from about 20% to 40% by weight. If desired, however, up to about one quarter of the sweetening agent can be added to the cooked fruit base along with the other essential components. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate and the like. Additionally, the present carbohydrate sweetening agents are to be distinguished from such protein-based sweetening agents as aspartame, thaumatin and monellin.

Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, glucose, fructose, corn syrup solids and honey. Highly preferred nutritive carbohydrate sweetening agents are those selected from the group consisting of sucrose, corn syrup solids and fructose. Of course, mixtures of the above-noted materials are contemplated herein.

While the above-exemplified sweetening agents are available in highly purified forms, other sources of sweetening agents which are not as highly purified can be used. For example, a relatively inexpensive material such as apple juice powder or (apple powder as it is commercially labeled) which is approximately 70% by weight (dry basis) sugars can be employed as nutritive sweetening agent. If used, such impure sources of sugars are employed at levels based upon their total sugars content. Up to 25% of the nutritive carbohydrate sweetening agent used herein can be supplied by such impure sweetening agents.

3. Bodying Agent

Another essential ingredient of the present dessert compositions is a malto dextrin bodying agent. The present bodying agents serve to both bulk and body and, most importantly, provide additional solids as to enable the realization of dessert compositions having moisture contents within the essential ranges given below. Generally, the malto dextrin component is present at from about 1% by weight to about 15% by weight. Superior results in terms of scoopability at freezer temperatures (0° F.) are obtained when the malto dextrin component is present in the dessert compositions of the present invention at from about 3% to 10% by weight. For best results, however, the malto dextrin component should be employed at from about 4% to 6% by weight.

It is important in the provision of frozen dessert compositions of organoleptically acceptable sweetness that the malto dextrin be bland and provide minimal sweetness. Thus, low D.E. (dextrose equivalent) malto dextrin should be employed. By low D.E. is meant a malto dextrin with a D.E. of less than about 20. Low D.E. malto dextrins are commercially available and the skilled artisan will have no difficulty in selecting suitable malto dextrins for use herein. Generally, however, malto dextrins can be obtained by dextrinization of starch, particularly corn starch. Enzymatic hydrolysis, optionally under acidic conditions, of the starch can be used; the conditions are so mild that negligible repolymerization occurs. This is in contrast to dextrins which typically are made from starch by hydrolysis and repolymerization by using high temperature and pressure by dry heating or roasting of starches (pyro-dextrins).

The malto dextrin component herein can be added entirely to the uncooked fruit base. Conversely, the entire malto dextrin component can be added to the cooked fruit puree along with the other essential components. In preferred embodiments of the present invention, however, some malto dextrin is added to the uncooked fruit puree. While not wishing to be bound to any proposed theory herein, it is speculated that the malto dextrins interact with the whole comminuted fruit component during the cooking step described in detail below. Moreover, in preferred embodiments of the present invention, some of the malto dextrin component is added to the present cooked fruit base along with the other essential components of the present dessert compositions. It is believed that such addition aids binding of water associated with these essential components aiding the body and texture of the finished dessert compositions. In the most highly preferred embodiments, up to about 50% of the malto dextrin is added initially to the uncooked fruit base.

Surprisingly, it has been discovered that certain ingredients previously recognized as being essential components of a cooked base in the provision of non-dairy compositions for aerated frozen desserts can be eliminated without substantial adverse effects. Thus, for example, the present dessert compositions can be satisfactorily prepared without including in the uncooked fruit base any of the following: ungellatinized starch, a food grade acidulant, water or water-soluble pectin.

The blend is then prepared by mixing or blending together in any order the fruit puree(s), sweetening agents, and (malto dextrin bodying agent) in such a manner as to achieve a uniform blend. Preferably, the sweetening agent and fruit puree are first blended thoroughly together. Thereafter, the malto dextrin bodying agent can, if desired, be added to the mixture with vigorous agitation until a relatively uniform blend is achieved. Finally, any optional components can be slowly added with more agitation until thoroughly dispersed to form the mixture.

Cooking

The uncooked blend as prepared above is then cooked in the present method of cooked fruit base preparation. It is speculated herein that during the cooking step, numerous complex and inter-related reactions occur including conversion of some insoluble pectin into soluble pectins, solids concentration increase and sugars reduction and conversion. The present cooking step is desirably practiced at temperatures ranging from about 185° F. to about 210° F. Maintenance of this temperature range during the cooking step desirably minimizes moisture and aromatic flavor constituents losses due to volitalization as well as minimizes flavor degradation from the inital fresh fruit flavor. The fruit base is cooked for about 30 to 60 minutes. Generally, shorter cook times within the essential cook time range are employed at higher temperatures within the above given temperature range. Conversely, longer cook times within the essential 30 to 60 min. cook time range are used at lower cook temperatures. Cook times within the above-given range and within the above-given temperature range are important to minimizing the problems of flavor loss and freeze thaw stability.

B. Whipping Agent

The present dessert compositions also essentially contain from about 0.3 to 1.5 of an acid-stable whipping agent. Better results are obtained when the present compositions contain from about 0.4 to 0.8 of the whipping agent. By "acid-stable" it is meant herein that the presently employable whipping agents be able to aerate the present dessert compositions which have a pH ranging from about 2.5 to 5.5 to densities of between about 0.2 to 0.95 g./cc. when the whipping agent is present within the above specified range.

Whipping agents are well known in the food art and selection of suitable materials for use herein as the acid-stable whipping agent will pose no problem to the skilled artisan. Suitable materials can be derived as protein hydrolyzates from, for example, vegetable proteins.

The protein hydrolyzates employed herein are water soluble (i.e., soluble at least to about 20% by weight at 25° C. throughout the pH range of about 2.0 to 10.0). The soy protein hydrolyzates disclosed in U.S. Pat. No. 3,814,816 (issued June 4, 1974 to R. C. Gunther, incorporated herein by reference) are particularly effective whipping proteins. These proteins are commercially available from Staley Mfg. Co., Decatur, Ill., and may be prepared by initially chemically hydrolyzing the soy protein to a prescribed viscosity range and thereafter enzymatically hydrolyzing the soy protein with pepsin to produce a pepsin modified hydrolyzed soy protein whipping agent. Other suitable whipping agents are described in detail in U.S. Pat. No. 3,889,001 (issued June 10, 1975 to Buide et al. and incorporated by reference herein).

C. Acid-Stable Polysaccharide Gums

The present dessert compositions also essentially comprise an acid-stable polysaccharide gum. The term "acid-stable" when used herein with reference to the polysaccharide gums indicates that the viscosity of gum dispersions of specified gum level at specified temperatures are little effected by the pH of the dispersion. More specifically, the term "acid-stable" is used to indicate that aqueous gum dispersions will vary in viscosity less than about 25% throughout the pH of the present food compositions, i.e., between about 2.5 to 5.5 at room temperature (25° C.).

The physical and chemical properties of edible polysaccharide gums are well known in the food art and selection of specific acid-stable gums will pose no problem to the skilled artisan (see, for example, "Gum Technology in the Food Industry", M. Glicksman, Academic Press, N.Y., 1969; "Food Colloids", ed. by H. D. Graham, Avi Publishing Co., Westport, Conn., 1977; and "Industrial Gums", R. L. Whistler 2nd ed., Academic Press, N.Y., 1973; each of which is incorporated herein by reference). Preferred gums for use herein are selected from the group consisting of guar gum, locust bean gum, xanthan gum and mixtures thereof. Best results in terms of mouthfeel, syneresis inhibition and aeration stability are realized when the polysaccharide gum is a mixture of xanthan, locust bean and guar gums. Exemplary gum mixture of this type is sold by Merck & Co. under the name Kelco GFS.

The polysaccharide gums are essentially present in the instant dessert compositions at from about 0.05% to 0.5%. Better results are obtained when the gums are present at from about 0.1% to 0.2%.

Particular gum utilization levels will depend upon the total moisture in the present compositions, the duration and temperature of the cooking step of the fruit base, the amount and type of fruit used to form the fruit puree, the particular gum(s) employed and the organoleptic properties desired in the present dessert compositions upon aeration. Generally, however, higher gum utilization levels will be employed with higher compositions moisture contents, shorter cook times and lower temperatures and lower fruit puree levels. Gum levels will also modestly influence the desired density of the aerated frozen dessert. Compositions of the present invention containing higher gum levels will generally provide frozen desserts exhibiting lower, fluffier densities upon aeration.

D. Edible Fatty Triglyceride

The present dessert compositions essentially comprise from about 1% to 15%, preferably between about 6% to 10% by weight of the composition of an edible fatty triglyceride. Maintenance of the edible fatty triglyceride level within the above ranges is important to the provision of frozen desserts having a desirably rich mouthfeel. Further, excessive fatty triglyceride levels can result in frozen desserts which are unspoonable at freezer temperatures (e.g., 0° F.) due to the dominance of the fat phase's physical properties at such temperatures.

Suitable fatty triglycerides can be either fats or oils. Fats useful herein should have melting points less than mouth temperatures, i.e., less than about 98° F. Any fatty triglyceride oil can be used, however, including even winterized oils. Of course, mixtures of fats and oils are contemplated for use herein.

Suitable fats and oils should be bland in taste, i.e., deodorized. Preferred triglycerides oils are additionally light in color, i.e., having a Gardener color scale value of less than four. For those embodiments to be statically frozen by consumer at-home preparation, the present oils preferably are winterized. Winterization is the common oil process whereby higher melting fractions are removed from edible oils to avoid clouding at refrigeration temperatures.

The present edible fatty triglyceride fats and oils can be derived from any of the naturally occurring liquid glyceridic oils such as soybean oil, cottonseed oil, peanut oil, sesame seed oil, and sunflower seed oil. Also suitable are liquid oil fractions obtained from palm oil, tallow, as for example, by graining or directed interesterification, followed by separation of the oil. Other suitabe edible oil materials and methods of edible oil preparation are described in detail in Bailey "Industrial Oil and Fat Products", (3rd Ed. 1964) which is incorporated herein by reference. Preferred materials are selected from the group consisting of coconut oil, soybean oil and mixtures thereof. Coconut oil is the fatty triglyceride of choice, particularly partially hardened coconut oil (e.g., 76° F. coconut oil, i.e., coconut oil which has been partially hydrogenated so as to have a melting point of about 76° F.).

E. Moisture Content

The total moisture content of the present dessert compositions essentially ranges between about 45% to about 75% by weight. In those embodiments of the present dessert compositions formulated for commercial preparation, the total moisture content desirably ranges from between about 62% to about 72% by weight. For those embodiments of the present dessert compositions useful for at-home preparation by static freezing, the moisture content desirably ranges from about 62% to about 55% by weight.

Typically, much of the water is supplied by the cooked fruit base component. However, when cooked fruit bases having low final moisture components are employed in the present dessert compositions, additional water must be employed so that the moisture content of the dessert composition is within the above-given essential range.

F. Optional Ingredients

The present dessert compositions can optionally contain a variety of additional ingredients suitable for rendering such compositions more organoleptically or aesthetically desirable or more nutritious. Such optional components include, for example, flavors, coloring agents, acidulants, nuts, vitamins, preservatives and the like. If present, such minor optional components should comprise from about 0.1% to 2.5% of the dessert compositions.

One preferred optional ingredient is conventional stabilized fruit for ice cream. Stabilized fruit for ice cream is commonly used in the ice cream industry. Such material comprises fruit pieces which have been sugar treated to remain soft at the typical freezer temperatures at which ice cream is typically stored, e.g., about 8° F. If present, such stabilized fruit can be used at from about 0% to 20% by weight of the present dessert compositions, preferably from about 5% to 10%. Stabilized fruit is desirably added to the present composition after aeration and freezing.

A conventional emulsifier for frozen aerated desserts can be optionally included in the present inventions. A wire variety of emulsifiers can be employed. Among the more suitable are mono- or diglycerides of fatty acids, such as monostearin and dipalmitin; polyoxyethylene, ethers of fatty esters of polyhydric alcohols, such as sorbitan, monostearate, or sorbitan distearate, fatty esters of polyhydric alcohols, such as sorbitan monostearate; mono- and diesters of glycols and fatty acids, such as propolyene glycol monostearate and propolyene glycol monopalmitate.

Composition Preparation and Use

The dessert compositions of the present invention are prepared by mixing together in any order and by any conventional means the essential and optional ingredients herein. Typically, a pre-blend of dry ingredients is added to a mixing vessel with moderate agitation that has been previously charged with the cooked fruit base, edible fatty triglyceride and water. After the ingredients are thoroughly mixed, the composition can be packaged in conventional packaging means such as pouches, tubs, cartons and the like. Optionally, the dessert compositions of the present invention can be homogenized. Such a homogenization step aids dispersion of the fatty triglyceride component. Conventional homogenization apparatus and techniques as described above can be employed.

Several packaging systems are contemplated to deliver to the customer those embodiments for the dessert compositions for at-home preparation by static freezing. One packaging embodiment comprises three packets or pouches. One pouch would contain the cooked fruit base, a second would contain the edible oil and a third packet would hold the remaining essential and optional ingredients, i.e., the whipping agent and polysaccharide gum. A second packaging embodiment would contain only a two pouch kit. One pouch would hold the edible oil while the other would contain the balance of the essential and optional ingredients. In each embodiment, however, the edible oil and cooked fruit base components are segregated. Prolonged contact between the edible oil and the cooked fruit base at the higher temperatures of shelf storage can result in the oil developing hydrolytic rancidity. The two pouches individually are shelf-stable and can be stored for an extended period of time when aseptically packaged or stored at freezer temperatures.

It is contemplated that the consumer would purchase the two or three pouch kits and then proceed to mix the ingredients of the pouches at his convenience. The resulting mixture is then aerated by whipping with a home mixer at for example, high speed for about 1 to 5 minutes. Aeration should be continued until about 50% to 150% overrun is achieved. The overrun refers to the percentage of increase in volume of the mixture. Such aeration ensures the provision of frozen desserts having densities similar to those of ice cream, ice milk, or an ice cream shake. These densities range from 0.2 to 0.95 g./cc. with a density of about 0.35 to 0.50 g./cc. being preferred.

The aerated mixture is then cooled to below a temperature of about 8° F. to harden the dessert. While it is contemplated that the dessert will be consumed in its hardened or frozen form, it is an advantage of the present invention that the product is heat-shock stable. Thus, the aerated mixture may be frozen, withdrawn from the freezer and allowed to warm, for example one hour, and statically refrozen to form a dessert of equivalent organoleptic attributes. Whether prepared at home by the consumer employing static freezing or prepared commercially prior to eventual sale, the present aerated frozen dessert compositions can be stored for extended periods at 0° F. without the development of large ice crystals.

Another use of the present compositions is in the commercial preparation of finished aerated frozen desserts similar to ice cream and sherbets. In this use, conventional commercial scale equipment can be employed to aerate and freeze the present dessert compositions. Thereafter, conventional packaging storage and distribution, e.g., plastic tubs and paperboard cartons can be used to package the aerated frozen dessert so prepared.

In still another use of the present compositions, the present compositions can be sold to fast food operations for use in conventional aeration and freezing units for immediate consumption of individual servings of a finished, soft aerated frozen dessert.

Another advantage of the present aerated frozen dessert is the relative absence of moisture loss or moisture migration from the dessert. Thus, such articles as frozen "ice cream" sandwiches or frozen pies can be realized which are not subject to immediate sandwich wafer or pie crust softening due to moisture migration from the dessert body. Of course, upon extended storage in unsealed containers, the ambient moisture in any freezer will serve to soften the wafer or pie crust if stored for long periods of time. Thus, for example, in the preparation of parfaits alternate layers of the present aerated frozen desserts can serve to insulate the other layers from moisture migration therebetween.

Still another advantage of the present compositions is that no tempering is required prior to serving. Most frozen desserts require upon removal from the freezer a period of time in order for them to come up to a serving temperature before they are servable. The present aerated frozen dessert products, however, can be cut, spooned, etc. at freezer temperatures and therefore need no tempering. As a result of the ability to be consumed at freezer temperatures without temperature increases due to tempering, the present aerated frozen desserts exhibit enchanced coldness perceptability.

The dessert compositions of the present invention are illustrated by the following examples:

EXAMPLE I

A non-dairy dessert composition of the present invention useful in the home preparation of an aerated frozen dessert is prepared having the following composition:

| Amount | Ingredient | Weight % |
| --- | --- | --- |
| 327.00g. | Strawberry cooked base | 60.00 |
| 6.73 | Whipping agent[1] | 1.23 |
| 1.64 | Polysacharide gum[2] | 0.30 |
| 34.91 | Sucrose | 6.41 |
| 21.03 | Malto dextrin[3] | 3.86 |
| 27.25 | Vegetable oil (soybean)[4] | 5.00 |
| 126.40 | Water | 23.20 |
| 544.96g. |  | 100.00% |

[1] A water-soluble soy protein hydrolyzate: Gunther D-100 WA - Manufactured and sold by A. E. Staley Manufacturing Co. (62% protein, 16% carbohydrate, 24% moisture)
[2] "GFS": A composite of guar gum, locust bean gum and xanthan gum marketed by the Kelco Division of Merck & Co., Inc.
[3] FRODEX 10 - a malto dextrin of 10 D.E. manufactured and sold by the American Maize Products Co.
[4] Durkex 25 - a winterized soybean oil sold by SCM Corp. Durkee Foods Division.

The strawberry cooked fruit base is prepared having the following composition:

| Amount | Ingredient | Weight % |
| --- | --- | --- |
| 375.00g. | Strawberry puree (25.8% solids; 20% sucrose) | 75.00 |
| 87.50 | Sucrose | 17.50 |
| 12.50 | High fructose corn syrup (30% water) | 2.50 |
| 25.00 | Malto dextrin (15 D.E.) | 5.00 |
| 500.00g. |  | 100.00% |

The total concentration of malto dextrin in the composition is 6.86%. The total sweetening agent level is 32.96%. The total moisture content is about 65.5%.

The strawberry cooked fruit base is prepared by first forming a strawberry puree from frozen "4 plus 1" strawberries, i.e. four parts strawberries and one part sucrose (to prevent disruption of cells during frozen storage). The whole strawberries are fed to a Hobart Corp. Vertical Cutter machine which comminutes the strawberries into a puree. The puree is then deseeded by passing it through an FMC Corp. fruit finisher or a Model 6600 pulper-finisher manufactured by Brown International, Inc. The deseeded strawberry puree is then fed to a two-stage homogenizer operating at 2500/500 psi to form a homogenized, deseeded strawberry puree. The puree is then homogenized a second time in a two-stage homogenizer at 5500/500 psi.

Thereafter, the homogenized, deseeded strawberry puree is charged to a steam heated, jacketed kettle equipped with a swept surface agitator. Next, a pre-blend of the cooked base dry ingredients (sucrose and malto dextrin) is added to the kettle along with the corn syrup. The blend is then heated to about 195° F. with agitation. The blend temperature is maintained at 195° F. for 45 minutes to form the cooked strawberry base. The cooked fruit is cooled to room temperature with cooling water. The moisture content is analytically determined to be 43.6%.

The cooked strawberry base is then admixed with the other essential and optional ingredients in a home mixer at low to medium speed for three minutes. Then, the mixture is whipped at high speed (about 850 RPM) for five minutes. The resulting aerated mixture is then placed in a suitable container and placed in the freezing compartment of a refrigerator (0° F.) for about 5 hours.

The resulting product is an aerated frozen dessert which has the texture and appearance of commercial ice cream. The dessert is spoonable even upon immediate withdrawal from the freezer. The moisture content is about 57%.

If desired, a three packet dessert mix can be used to deliver the compositions of this example to the consumer. One packet can be a can or plastic pouch containing the cooked fruit base and water. A second plastic packet contains the oil while the third packet comprises a dry blend of the whipping agent, the polysaccharide gum, and the balance of the sucrose and malto dextrin not part of the cooked fruit base.

Compositions of similar physical and organoleptic properties are realized when in the Example I dessert compositions the strawberry puree is replaced with an equivalent amount of puree derived from previously frozen cherries, blueberries, raspberries and mixtures thereof.

Compositions of similar physical and organoleptic properties are realized when in the Example I dessert compositions the soybean oil is substituted with an equivalent amount of corn oil, safflower oil, peanut oil, sunflower seed oil or mixtures thereof.

EXAMPLE II

A non-dairy dessert composition of the present invention especially suitable for commercial production of aerated frozen desserts is prepared having the following composition.

| Amount | Ingredient | Weight % |
| --- | --- | --- |
| 566.30 lbs. | Cooked peach base | 56.630 |
| 344.27 | Distilled water | 34.427 |
| 12.10 | Sucrose | 1.210 |
| 5.00 | Whipping Agent[1] | 0.500 |
| 10.00 | High fructose corn syrup | 1.000 |
| 59.08 | 76° Coconut Oil | 5.908 |
| 1.55 | Guar gum and locust bean gum (1:1) | 0.155 |
|  | Optionals |  |
| 1.50 | Emulsifier (Polysorbate 60) | 0.150 |
| 0.20 | Tetra Sodium Phosphate | 0.020 |
| 1000.00 lbs. |  | 100.000% |

[1] A water-soluble soy protein hydrolyzate: Gunther D-100 WA - Manufactured and sold by A. E. Stanley Manufacturing Co. (62% protein, 16% carbohydrate, 24% moisture).

The cooked fruit base is prepared having the following formulation:

| Amount | Ingredient | Weight % |
| --- | --- | --- |
| 60 lbs. | Peach puree | 60.00 |
| 20 | Sucrose | 20.00 |
| 15 | High fructose corn syrup (42% fructose) | 15.00 |
| 5 | Malto dextrin (10 D.E.) | 5.00 |
| 100 lbs. |  | 100.00% |

The cooked fruit base is prepared in a manner similar to that described above in Example II.

To prepare the composition, a pre-blend of all the dry ingredients except the emulsifier is prepared by simple dry mixing. The emulsifier is melted into the coconut fat by first heating the coconut fat to 100° F. and then adding the emulsifier to the coconut oil with mild agitation continued for five minutes.

The cooked base is charged to a large kettle equipped with an agitator. The water is then added. Next, the pre-blend of dry ingredients is slowly added and mixed until dissolved typically requiring about five minutes. Thereafter, the high fructose corn syrup is added using a metered pump. The still hot coconut oil and emulsifier are then added and mixed.

The entire mixture is then heated to 110° F. to ensure that the coconut fat remains an oil and the dessert composition is homogenized in a two-stage homogenizer at 2500/500 psi.

The dessert composition is then cooled to between 35° to 45° F. Thereafter, the composition is aerated and frozen in commercial ice cream apparatus and packaged in cardboard containers. The aerated frozen dessert so prepared is then hardened for 24 hours at 0° F. and is then ready to be distributed through conventional ice cream channels.

EXAMPLE III

A dessert composition of the present invention is prepared that is particularly suited for the provision of individually quick frozen aerated desserts useful in the fast food trade.

A cooked fruit base is prepared in accordance with the method of Example I having the following formulation:

| Amount | Ingredient | Weight % |
|---|---|---|
| 60 lbs. | Raspberries | 60.00 |
| 25 | Sucrose | 25.00 |
| 10 | High fructose corn syrup | 10.00 |
| 5 | 10 D.E. malto dextrin | 5.00 |
| 100 lbs. | | 100.00% |

The cooked fruit base has a moisture content of 54.6%.

The following formulation is prepared:

| Amount | Ingredient | Weight % |
|---|---|---|
| 35.00 lbs. | Raspberry cooked fruit base | 35.00 |
| 50.33 | Distilled water | 50.33 |
| 0.45 | Whipping Agent[1] | 0.45 |
| 0.80 | Polysaccharide gums[2] | 0.80 |
| 3.95 | Sucrose | 3.95 |
| 6.91 | Coconut fat (76° F.) | 6.91 |
| 2.56 | 10 D.E. Malto dextrin | 2.56 |
| 100.00 lbs. | | 100.00% |

[1] A water-soluble soy protein hydrolyzate: Gunther D-100 WA - Manufactured and sold by A. E. Staley Manufacturing Co. (62% protein, 16% carbohydrate, 24% moisture).
[2] "GFS": A composite of guar gum, locust bean gum and xanthan gum marketed by the Kelco Division of Merck & Co., Inc.

The moisture content of the dessert composition is about 69.0%.

The dessert composition is prepared in a manner similar to that described in Example III. However, the composition is simultaneously aerated and frozen in a Taylor Freeze Corp. Model 8751 freezer to 20°-22° F. and served on cones or in cups.

What is claimed is:
1. A non-dairy composition useful in the preparation of an aerated frozen dessert containing whole fruit puree which is spoonable at freezer temperatures and which is heat-shock stable, comprising:
   A. from about 35% to 80% by weight of a cooked, fruit base consisting essentially of,
      (1) from about 20% to 80% by weight of the base of a puree of whole fruit,
      (2) from 20% to 80% by weight of the base of a nutritive carbohydrate sweetening agent, and wherein the fruit base has been cooked for about 30 to 60 minutes at from about 180° F. to 210° F.;
   B. sufficient acid-stable whipping agent to enable aeration of the composition to a density ranging from about 0.2 to 0.95 g./cc.;
   C. from about 0.05% to 0.5% by weight of an acid-stable polysaccharide gum;
   D. from about 1% to 15% of an edible fatty triglyceride;
   E. from about 1% to 15% by weight of a malto dextrin bodying agent; and
   F. sufficient water to provide the composition with a moisture content of about 45% to 75%.

2. The food composition of claim 1 wherein the whipping agent is present at from about 0.3% to 1.5% by weight.

3. The composition of claim 2 wherein the comminuted fruit puree has a moisture content of between about 75% to 90% by weight.

4. The composition of claim 3 wherein the fruit puree is homogenized.

5. The composition of claim 4 wherein the fruit puree is present at from about 50% to 70% by weight of the cooked fruit base.

6. The composition of claim 5 wherein the cooked fruit base is present at from about 40% to 60% by weight.

7. The composition of claim 6 wherein the acid stable whipping agent is present at from about 0.4% to 6.8%, the polysaccharide gum is present at from about 0.1% to 0.2%, and the edible fatty triglyceride is present at from about 6% to 10% by weight.

8. The composition of claim 7 wherein the moisture content ranges from about 62% to 72% by weight.

9. The composition of claim 8 wherein the polysaccharide gum is selected from the group consisting of locust bean, guar, xanthan and mixtures thereof.

10. The composition of claim 9 wherein the cooked fruit base is present at from about 45% to 55% by weight.

11. The composition of claim 10 wherein the fruit puree is present in the mixture at from about 55% to 65% by weight.

12. The composition of claim 11 wherein the sweeting agent is present at from about 20% to 40% of the mixture.

13. The composition of claim 12 wherein the malto dextrin is present at from about 4% to 6% by weight.

14. The composition of claim 7 wherein the edibly fatty triglyceride is winterized and the moisture content ranges between about 62% to 55% by weight.

* * * * *